United States Patent [19]

Brooks

[11] Patent Number: 5,341,278
[45] Date of Patent: Aug. 23, 1994

[54] SWITCHING PULSED RESONANT DC-DC CONVERTER POWER AMPLIFIER

[76] Inventor: Steven W. Brooks, c/o Calaway and Brooks, 216 S. Reservoir St., Pomona, Calif. 91766

[21] Appl. No.: 932,674

[22] Filed: Aug. 20, 1992

[51] Int. Cl.$^5$ .......................................... H02M 3/335
[52] U.S. Cl. ....................................... 363/16; 363/65; 323/271
[58] Field of Search .................. 363/65, 16, 69; 323/222, 271

[56] References Cited

U.S. PATENT DOCUMENTS

| | | | |
|---|---|---|---|
| 4,648,017 | 3/1987 | Nerone | 363/28 |
| 4,703,789 | 5/1988 | Puskas | 310/316 |
| 4,727,469 | 2/1988 | Kammiller | 363/56 |
| 4,743,839 | 3/1988 | Barthold | 363/16 |
| 4,803,610 | 2/1989 | Gulczynski | 363/70 |
| 4,841,220 | 6/1989 | Tabisz et al. | 323/282 |
| 4,857,822 | 8/1989 | Tabisz et al. | 323/282 |
| 4,926,302 | 5/1990 | Harada et al. | 363/16 |
| 4,959,764 | 9/1990 | Bassett | 363/16 |
| 5,065,300 | 11/1991 | Jacobson et al. | 363/16 |
| 5,066,900 | 11/1991 | Bassett | 363/224 |
| 5,073,849 | 12/1991 | Morris | 363/21 |
| 5,097,196 | 3/1992 | Schoneman | 323/222 |
| 5,126,931 | 6/1992 | Jitaru | 363/21 |
| 5,164,656 | 11/1992 | Gulczynski | 323/222 |

OTHER PUBLICATIONS

"Switching Supplies"-Bassett, Electronics Jan. 7, 1988 p. 147.

Primary Examiner—Steven L. Stephan
Assistant Examiner—Adolf Berhane
Attorney, Agent, or Firm—Daniel Robbins

[57] ABSTRACT

A single sided dc-dc converter utilizes a switched resonant circuit having pulsed currents and voltages. A pair of MOSFET switches are used to alternately charge a capacitor in series with an inductor from an input voltage source, and then to discharge the capacitor through a second inductor into an output capacitor. The charge and discharge currents are in the form of pulses, and flow in the same direction into the output capacitor to directly establish the output voltage. Both the "on" and "off" switching of each of the MOSFET switches is accomplished at zero current.

For a given input voltage source, the output voltage of the converter is determined by the size of the output capacitor and the repetition rate of the "on-off" charge-discharge sequences. The voltage output of the converter is monitored, and a controller responsive to changes in the output voltage varies the repetition rate of the charge-discharge cycle to maintain constant voltage output. For increased current capability, a series of converters have their outputs connected in parallel. In addition to a controller simultaneously controlling the repetition rates of the paralleled converters, a sequencer connects and disconnects converters as load conditions dictate. Each converter is inherently capable of withstanding a short circuit applied to its output without suffering damage, and each converter returns to full operation on removal of the short.

12 Claims, 8 Drawing Sheets

SWITCHING PULSED RESONANT DC-DC CONVERTER POWER AMPLIFIER

1. Field of the Invention

This invention relates to a switching pulsed resonant dc-dc converter, and in particular to a switching pulsed series resonant dc-dc converter power amplifier for driving a dc motor.

2. Description Relative to the Prior Art

Switching converters are increasingly being used to provide compact, high performance power supplies for a variety of applications. The earliest switching converter, the pulse width modulator switching converter, uses square waves to control output voltage. Efficiency level is in the range of seventy to eighty percent, and for a kilowatt converter this results in a significant amount of power being thrown away. These losses are primarily switching losses which occur when the switch must be turned "on" or turned "off" while conducting a very large current. The magnitude of the power loss is a function of the "turn on-turn off" time and the frequency of operation. The currently available power MOSFET transistor has reduced "turn on-turn off" times which permits increased operating frequencies, with an attendant reduction in the size of the magnetics and the filter capacitors. However, switching losses are still significant as the higher operating frequencies result in more "on-off" transitions per second.

Another currently employed topology is the switched resonant inductor-capacitor (LC) circuit converter. There are many versions of the switched resonant converter using either series or parallel LC circuits. In general, the energy transfer is characterized by sinusoidal resonant voltages and currents flowing between the inductor and capacitor comprising the resonant circuit. The sinusoidal voltage is impressed upon an output transformer winding which feeds a rectifier to provide the output dc voltage. U.S. Pat. No. 5,073,849 entitled "Resonant DC to DC Converter Switching at Zero Current" gives examples utilizing a basic configuration, as does U.S. Pat. No. 4,727,469 entitled "Control For a Series Resonant Power Converter".

Another prior art circuit topology employing resonant sinusoidal currents and voltages is the quasi-resonant single sided dc-dc converter. In the quasi-resonant dc-dc converter, a frequency controlled switch closes to connect a dc power source, via a diode, to an inductor in series with a capacitor having one side at ground. Resonant sinusoidal current flows in the inductor and capacitor, charging the capacitor to twice the dc power source potential. The diode prevents current from the charged capacitor flowing back towards the switch and under zero current condition the switch controller opens the switch. The charged capacitor discharges into the output filter, providing a single sided supply whose voltage level depends upon the duty cycle of the charge-discharge cycle. Such a supply is described in the periodical "Electronics", Jan. 7, 1988, page 147 in an article entitled "Switching Supplies: Changing With The Times", by J. Bassett.

SUMMARY OF THE INVENTION

Rather than employing a switched resonant circuit in which the waveforms are sinusoidal, the single sided dc-dc converter of the present invention utilizes a switched resonant circuit having pulsed currents and voltages. A pair of MOSFET switches are used to alternately charge a capacitor in series with an inductor from an input voltage source, and then to discharge the capacitor through a second inductor into an output capacitor. The charge and discharge currents are in the form of pulses, and flow in the same direction into the output capacitor to directly establish the output voltage. Both the "on" and "off" switching of each of the MOSFET switches is accomplished at zero current.

For a given input voltage source, the output voltage of the converter is determined by the size of the output capacitor and the repetition rate of the "on-off" charge-discharge sequences. The voltage output of the converter is monitored, and a controller responsive to changes in the output voltage varies the repetition rate of the charge-discharge cycle to maintain constant voltage output.

For increased current capability, a series of converters have their outputs connected in parallel. In addition to a controller simultaneously controlling the repetition rates of the paralleled converters, a sequencer connects and disconnects converters as load conditions dictate.

Each converter is inherently capable of withstanding a short circuit applied to its output without suffering damage, and each converter returns to full operation on removal of the short. Consequently, a high current power amplifier or power supply comprised of paralleled converters controlled and sequenced in accordance with the teachings of the invention is also immune to damage under shorted output conditions.

A power supply or power amplifier configured from eight converters having paralleled outputs has a rating of 2 kilowatts at an output voltage of 40 volts at an efficiency better than 90% in power conversion.

BRIEF DESCRIPTION OF THE DRAWINGS

The invention will be described with respect to the drawings of which.

DESCRIPTION OF THE PREFERRED EMBODIMENT

Figure 1:
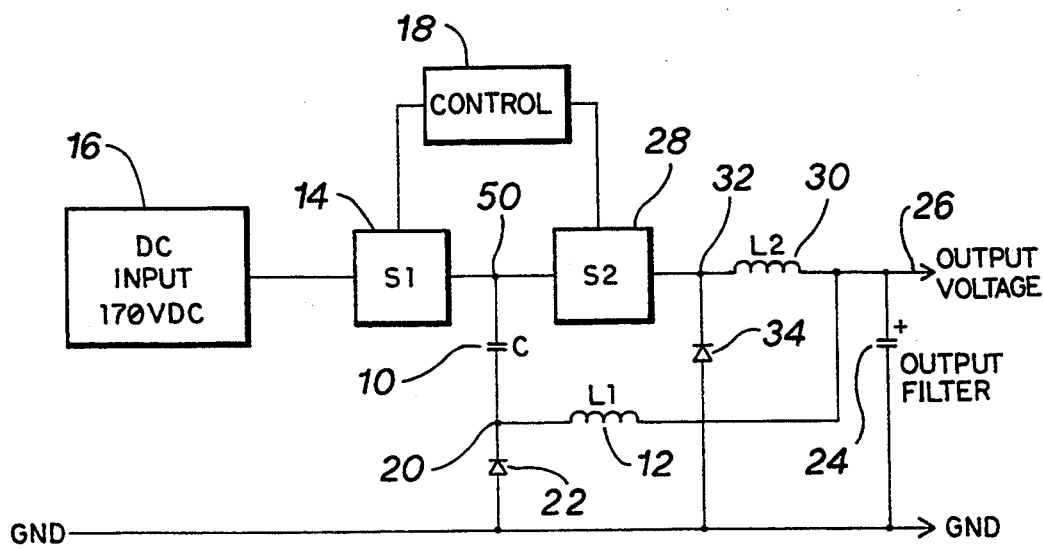
FIG. 1 is a schematic drawing of the pulsed resonant converter of the invention.

Before describing the operation of a high current supply consisting of a group of paralleled converters, the operation of the basic converter circuit will be presented. Referring to FIG. 1, an initially uncharged capacitor 10 in series with an inductor 12 is first connected to an input dc supply 16 by means of a MOSFET switch 14 activated by a controller 18. Because the voltage across the capacitor 10 cannot change instantaneously from its uncharged value of 0 volts, the potential at the point 20 jumps to the dc input voltage amplitude. Also the current in inductor 12 cannot change instantaneously, and therefore switch 14 turns on with no current flowing. As resonant current begins to flow in the LC circuit (10,12), the capacitor 10 charges and the voltage at point 20 begins to decrease. When the point 20 drops to ground, a diode 22 turns "on" clamping one side of the capacitor 10 to ground, effectively breaking the resonant circuit connection between the capacitor 10 and inductor 12. As the current in the inductor 12 cannot change instantaneously, current continues to flow in the inductor 12, but the current is now sourced from ground through the diode 22, rather than from the capacitor 10. When the capacitor 10 has charged to the amplitude of the dc input voltage 16, no more current flows through the MOSFET 14 because the capacitor 10 having one end clamped to ground, cannot charge to a voltage higher than the input supply 16. ( It will be noted that if the diode 22 were not present, the junction of the capacitor 10 and the inductor 12 would sinusoidally drop to (−) the input supply 16 voltage amplitude, and the magnitude of the voltage across the capacitor 10 would be twice the input supply voltage, as in the case of the quasi-resonant converter.) At this time the controller 18 opens the switch 14, but as current in the inductor 12 cannot change instantaneously, current flows from ground to maintain the current through the inductor 12 until all the energy stored in the inductor 12 is passed to the output load. The current pulse generated during the "on" time of the switch 14 feeds from the inductor 12 to an output filter capacitor 24 which charges towards the desired output voltage 26.

Immediately after the controller 18 turns the MOSFET switch 14 "off", it turns the MOSFET switch 28 "on". The charged capacitor 10 begins to discharge through the MOSFET switch 28 and through the inductor 30, and the discharge current flows into the output capacitor 24. The junction point 32 cannot drop below ground due to the clamping action of the diode 34, so when the capacitor 10 is completely discharged no current tends to flow through the MOSFET switch 28, and the controller turns the MOSFET switch 28 "off" under zero current conditions. The current flowing in the inductor 30 cannot change instantaneously, and the diode 34 sources current from ground into the inductor 30 after the MOSFET switch 28 opens. Current continues to flow from the inductor 30 into the output capacitor 24 until all the energy stored in the inductor 30 is passed to the output load. It will be noted that the decay time constant of the inductors 12 and 30 compared to the charge and discharge times of the capacitor 10 may be relatively long. In fact, current will continue to flow from the inductor 12 during the discharge cycle and it adds to the current flowing from the inductor 30 into the output capacitor 24. For the proper operation of the converter, it is necessary that the currents in the inductors 12, 30 decay to zero before the next charge cycle is initiated, and this constraint sets the maximum repetition rate of the charge-discharge operation. To insure no residual currents in the inductors 12,30, the charge-discharge operation is performed with a duty cycle no higher than 25%.

Figure 2A:
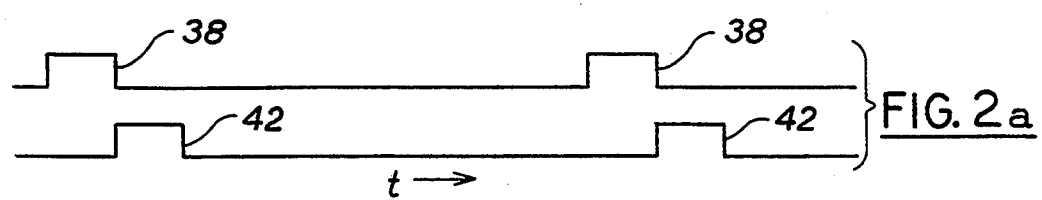
FIGS. 2a–2g are waveforms illustrative of the operation of the invention.

In FIG. 2a, typical turn "on" pulses 38 for the charging MOSFET switch 14, and typical turn "on" pulses 42 for the discharge MOSFET switch 28 are each shown with a duty cycle of 25%. As stated above, this is the maximum allowable repetition rate, and at the lower repetition rates the time separation between the pulses 38 and between the pulses 42 are correspondingly increased.

Figure 2B:
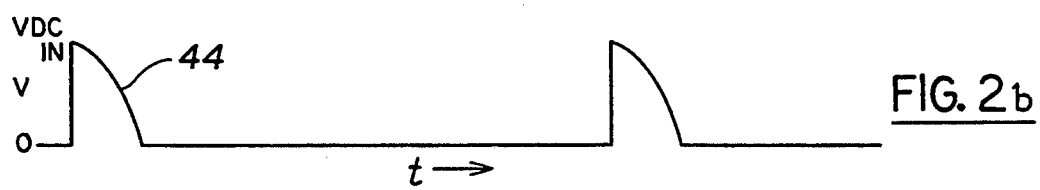

FIG. 2b illustrates the potential at the junction 20 of the capacitor 10 and inductor 12, (FIG. 1), during the charge cycle. When the MOSFET switch 14 is turned "on" by the pulse 36, the potential at the junction 20 immediately jumps to Vdc input 16, and while the capacitor 10 is charging to the potential Vdc input 16, the voltage 44 at the junction 20 is decreasing until it reaches ground potential. At this time, the diode 22 begins to conduct, clamping one side of the capacitor 10 to ground.

Figure 2C:
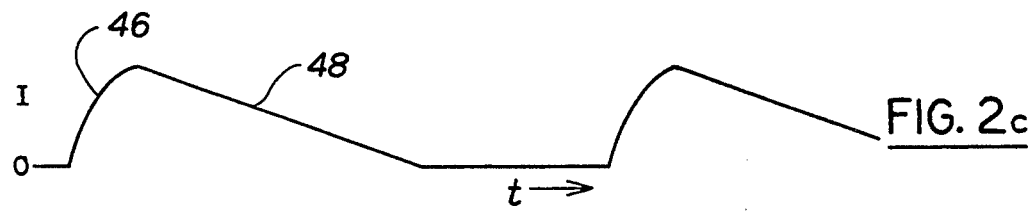

In FIG. 2c, the current through the MOSFET switch 14 which charges the capacitor 10 and flows in the inductor 12 is shown. Starting from zero, the current 46 increases to its maximum value prior to the time when the capacitor 10 is fully charged. When capacitor 10 is fully charged and its current goes to zero, the current flowing in the inductor 12 cannot instantaneously change, and the inductor 12 current 48 is now sourced from ground through the diode 22. The current flowing in the inductor 12 now decays in an approximate linear manner 48, with a time constant determined by the inductance, and the voltage across the inductor 12 which is the output voltage 26 plus the voltage drop across the diode 22.

Figure 2D:
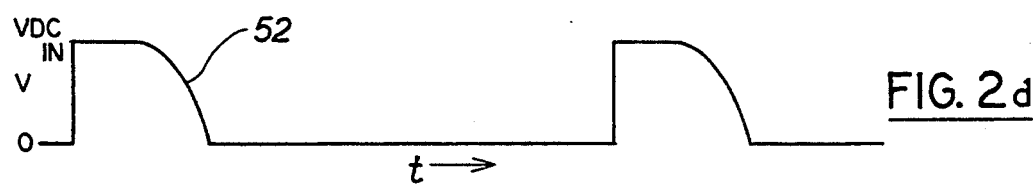
Figure 2E:
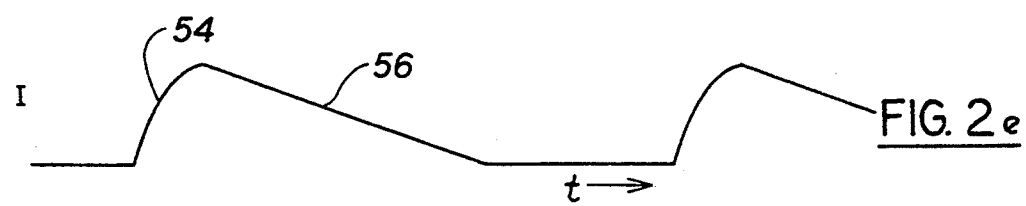
Figure 2F:
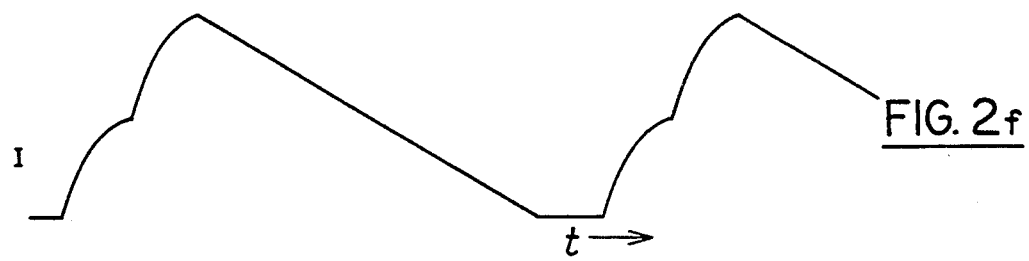
Figure 2G:
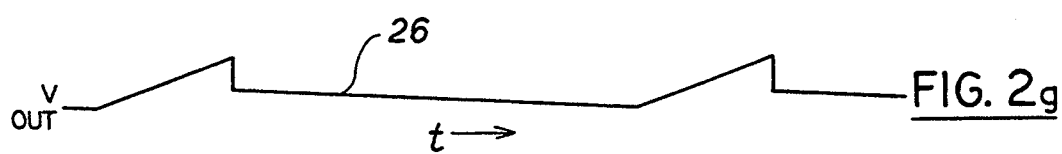

Just after the capacitor 10 is charged, the turn "on" pulse 38 is terminated turning "off" the charging MOSFET 14, and the discharge MOSFET switch 28 is activated by means of the turn "on" pulse 42. FIG. 2d illustrates the voltage at the junction point 50 of the two switching MOSFETS 14,28 and one side of the capacitor 10. During the charge cycle this point is at the voltage Vdc 16 being connected to the dc input source 16 by the "on" MOSFET 14. The voltage at this point begins to drop when MOSFET 14 is "off", and the capacitor 10 discharges through the "on" MOSFET 28. The voltage 52 cannot fall below ground due to the clamping action of the diode 34. In FIG. 2e, the discharge current 54 of the capacitor 10 is shown starting with the turn "on" of the MOSFET 28 and continuing until the capacitor voltage drops to 0. (FIG. 2d) As in the case of the inductor 12, current 56 is now sourced from ground through the diode 34 until the energy stored in the inductor 30 is transferred to the output 26. The charge and discharge currents, FIG. 2c, FIG. 2e, add at the output capacitor 24, FIG. 2f, to provide the output voltage 26, FIG. 2g.

Figure 3:
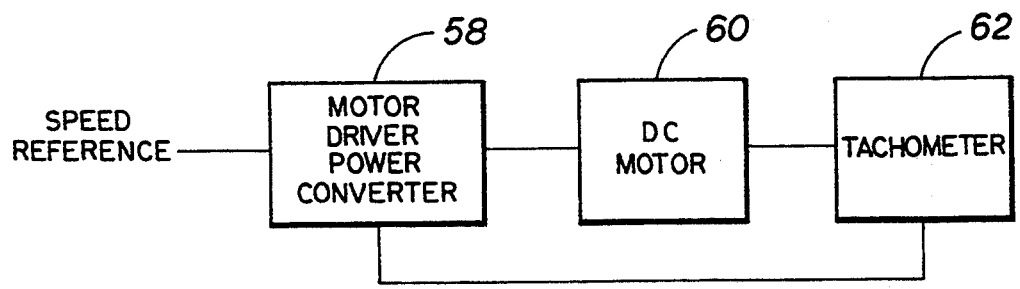
FIG. 3 is a block diagram showing the converter of the invention configured as a servoed motor driver.

FIG. 3, illustrates a d.c. motor driver power converter 58 comprised of eight of the above dc-dc converters with paralleled outputs configured to drive a dc motor 60. A tachometer 62 connected to the motor 60 provides a d.c. feedback signal proportional to motor 60 speed for controlling the power converter 58 voltage as a function of load.

Figure 4:
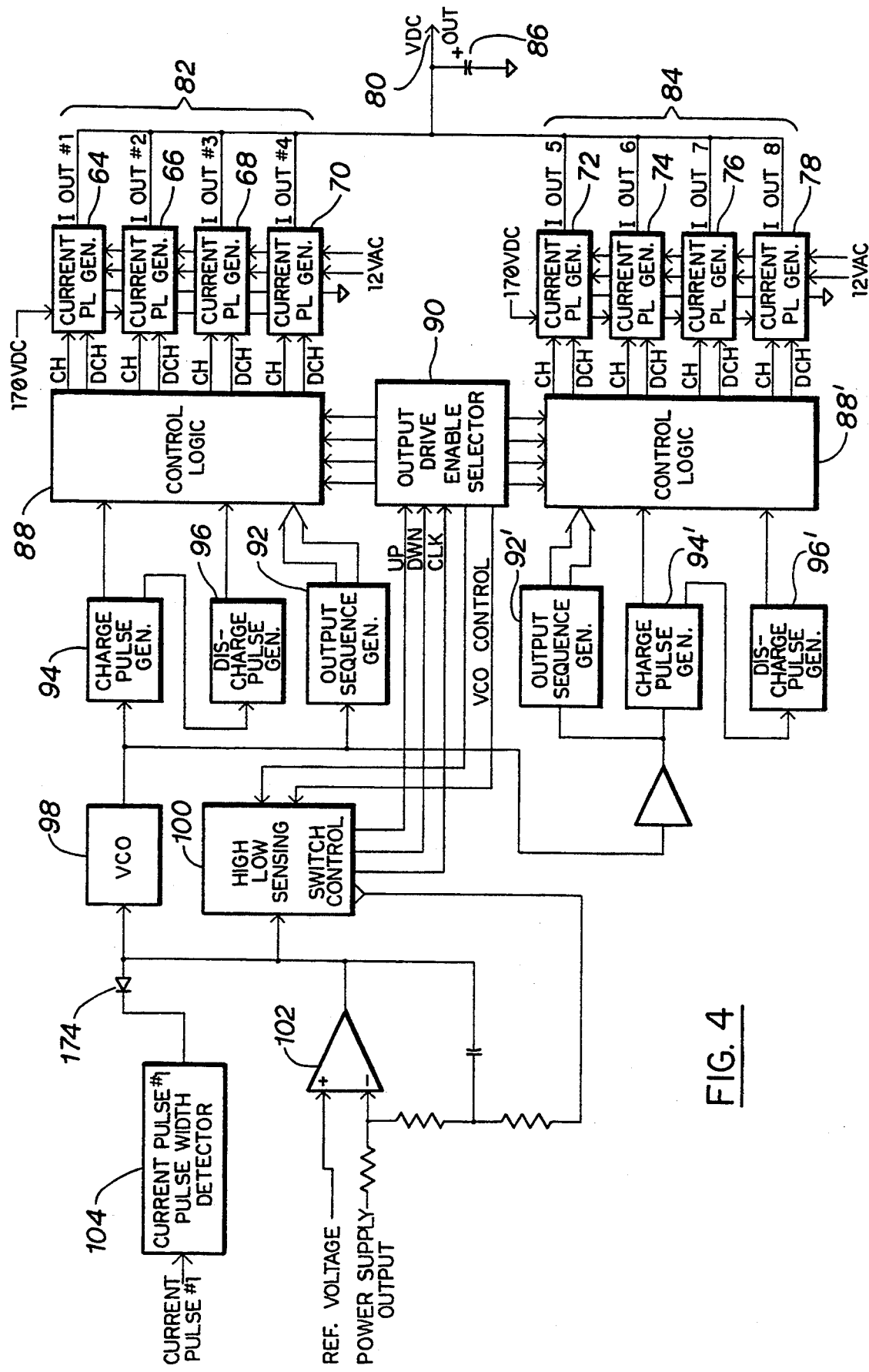
FIG. 4 is a block diagram of a high current, fixed voltage power supply configured from eight paralleled converters of FIG. 1, FIGS. 5a–5m are waveforms useful in understanding the operation of the converters of FIG. 4, FIGS. 6a, 6b and 7 are circuit diagrams of the supply of FIG. 4.

An overview of the operation of the converters configured as a fixed voltage power supply may be understood by referring to the block diagram of FIG. 4. This supply is designed for converting an unregulated voltage of 170 volts d.c. to a voltage of 40 volts d.c. with a load requirement of from 0 to 50 amperes. Eight of the dc to dc converters of FIG. 1, 64–78 have their outputs paralleled to provide the output voltage 80. The converters 64–78 are divided into two banks, bank 82 consisting of converters 64–70, and bank 84 consisting of converters 72–78. The first converter 64 of the bank 82 is always on line. For greater load current requirements, additional converters from bank 82 and from bank 84 are placed on line in pairs, one from each bank. After seven converters are on line, (four from bank 82 and three from bank 84), a demand for more current calls the last converter from bank 84 to be placed on line. Decreased demand for current is met by dropping converters off line in the reverse order; one from bank 84, then one each in pairs from bank 82 and 84 until only the converter 64 of bank 82 is left on line.

The typical charge pulses 38 originating in a charge pulse generator 94 and the typical discharge pulses 42 originating in a discharge pulse generator 96 are fed to the active converters 64–70 of bank 82 by a control unit 88. Typical charge pulses 38' originating in a charge pulse generator 94' and typical discharge pulses 42' originating in a discharge pulse generator 96' are fed to the active converters 72–78 of bank 84. To minimize ripple on the output voltage, the charge pulses 38' and discharge pulses 42' are shifted by one half clock period with respect to the charge pulses 38 and discharge pulses 42 as will be explained below. The charge pulses 38' and discharge pulses, 42' are applied to the converters 72–78 of bank 84 by means of a control logic unit 88'.(In the drawings, different but corresponding elements are designated by primed reference numbers.)

The repetition rate of the charge and discharge cycles are under control of a voltage controlled oscillator (VCO) 98 which speeds up when the output 80 tends to drop, and which slows down when it tends to rise. If the change in output exceeds an amount correctable only by changing the repetition rate of the current pulses fed to the output capacitor 86, then the output drive enable sequencer 90 and a high low sensing switch control 100 either call for the on line addition or subtraction of additional converters 64–78. The voltage output of the power supply is sensed and is compared to a reference voltage by means of a linear amplifier 102, whose output controls both the VCO 98 and output drive sequencer 90. As previously noted, in motor applications (FIG. 3), this reference voltage is replaced by a speed reference voltage and the output voltage feedback is replaced by a d.c. speed feedback signal derived from a tachometer driven by the motor.

An additional control of the VCO 98 repetition rate is provided by a pulse width detector 104 which monitors the current pulse from the converter (64), as will be explained below.

Figure 5A:
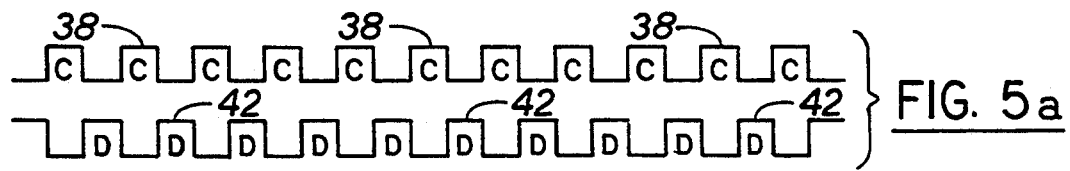
Figure 5B:
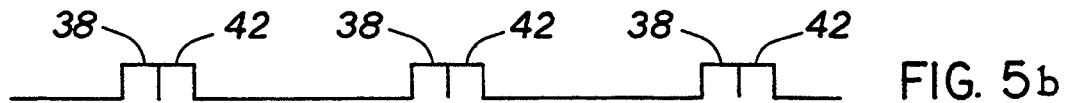
Figure 5C:
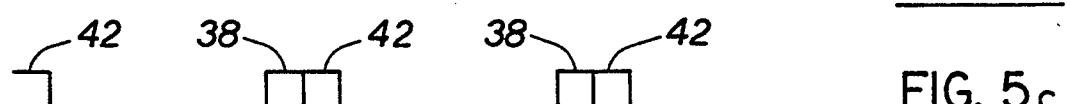
Figure 5D:
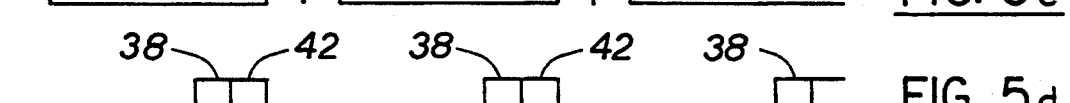

Before a discussion of the detailed circuit operation, it is advantageous to consider the times of occurrence of the individual charge-discharge cycles as the successive converters 64–78 are brought on line. To simplify the discussion, the effect of bringing single converters 64–70 from bank 82 on line will first be addressed. With this in mind, the advantages of simultaneously bringing one converter from bank 82 and one converter from bank 84, as in fact is the case in this embodiment, will be described. Referring to FIG. 5a, the typical charge-discharge pulses 38,42 of FIG. 2a are replotted. Before considering FIG. 5b, it is again noted that converter 64 is always active; even when there is no load on the supply and no current is being drawn. As converter 64 is always on line, its charge-discharge cycle is regarded as the reference cycle. FIG. 5b shows this charge-discharge cycle for the particular case where the duty cycle is at its maximum value of 25%. It will be recalled that on each of these cycles current flows into the output capacitor 86. It is advantageous to keep the current pulse flow as symmetrical in time as possible to reduce the amplitude of the ac component in the output voltage 80. Therefore the next converter placed on line is the one whose charge-discharge cycle does not occur right at the end of the charge-discharge cycle of converter 64 but is displaced as seen in FIG. 5c. It will be seen that by so doing the charge-discharge pulses for the case of the first two converters brought on line are uniformly spaced in time. In adding the next converter on line, it is not possible to maintain complete uniformity of the charge-discharge signals when the signals of FIG. 5d are combined with those of FIG. 5a, and 5b. When the fourth converter having the phasing of FIG. 5e comes on line,the charge-discharge cycles are again uniform and FIG. 5f represents the uniform train of current pulses feeding the output capacitor 86.

Figure 5E:
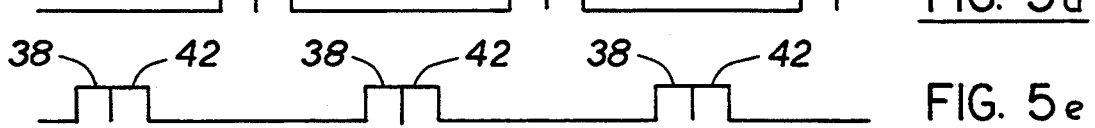
Figure 5F:
Figure 5G:
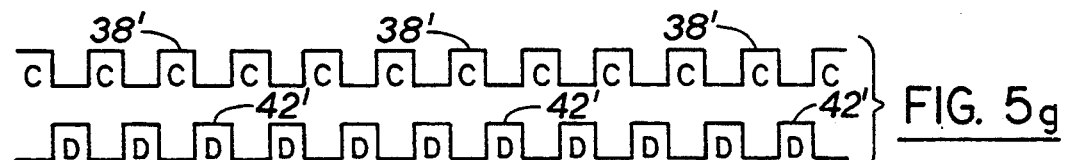
Figure 5H:
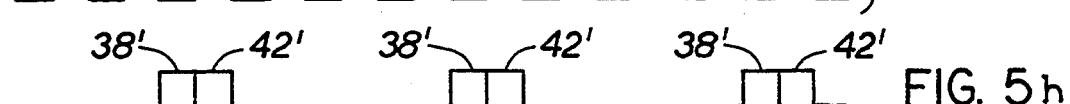
Figure 5I:
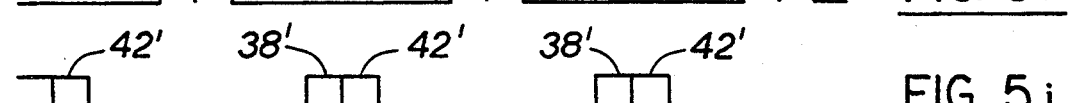
Figure 5J:
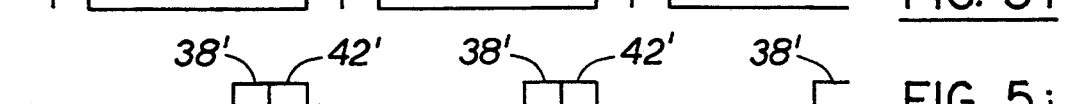
Figure 5K:
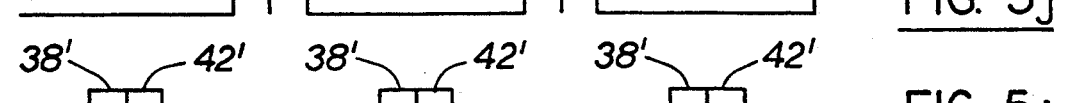
Figure 5L:
Figure 5M:
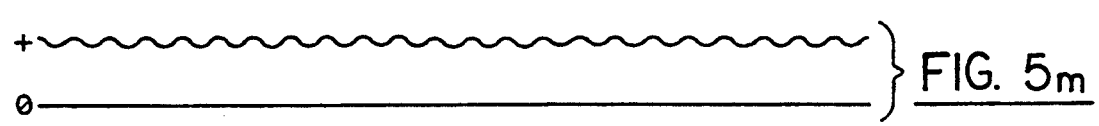

It will be seen that while the current pulses are uniform in time when the entire bank 82 converters is on line, the current waveform of FIG. 5f is characterized by peaks and troughs. It is to smooth out those peaks and troughs that the converters of bank 84 are effectively paired with those of bank 82 in the following manner. The charge generator 94' and the discharge generator 96' provide typical charge pulses 38' and typical discharge pulses 42' that activate the converters 72–78 of bank 84. These pulses are shifted ½ clock period with respect to the charge pulses 38 and discharges pulses 42 as shown in FIG. 5g. An output sequence generator 92', synchronously tied to the charge pulse generator 94' and discharge pulse generator 96' provides sequences of charge-discharge cycles exactly corresponding to those of FIGS. 5b–5e. These cycles are shown in FIGS. 5h–5k. The corresponding output current waveforms when bank 82 is fully activated is shown in FIG. 5l. Note that the peaks of FIG. 5f occur at the same times as the troughs of the current waveform of FIG. 5l. As previously stated, with a single exception, pairs of converters, one each from bank 82 and bank 84 are placed on line together. For example, the converter of bank 82 having the cycle sequence seen in FIG. 5c is brought on line with the converter of bank 84 having the cycle sequence seen in FIG. 5i. The time uniformity of charge-discharge cycling previously described is still maintained, however the portions of the current waveforms of FIGS. 5f and 5l corresponding to this particular timing now overlap, and the troughs and peaks are smoothed out decreasing the ripple present in the output voltage 80. Similarly, the converter having the waveform of FIG. 5d is paired with the converter having the waveform of FIG. 5j, and that of FIG. 5e is paired with that of FIG. 5k, with corresponding effects on the output ripple.

The pairing of the converters of bank 82 and 84, and the order in which the converters are brought on line and off line is shown in Table I.

TABLE I

| CONVERTER | STATUS | SELECTOR | | | |
|---|---|---|---|---|---|
| | | 03 | 02 | 01 | 00 |
| 64 | Always on line | — | — | — | — |
| 68 & 76 | 1st on, 4th off | 0 | 0 | 0 | 1 |
| 66 & 74 | 2nd on, 3rd off | 0 | 0 | 1 | 1 |
| 70 & 78 | 3rd on, 2nd off | 0 | 1 | 1 | 1 |
| 72 | 4th on, 1st off | 1 | 1 | 1 | 1 |

Figure 6A:
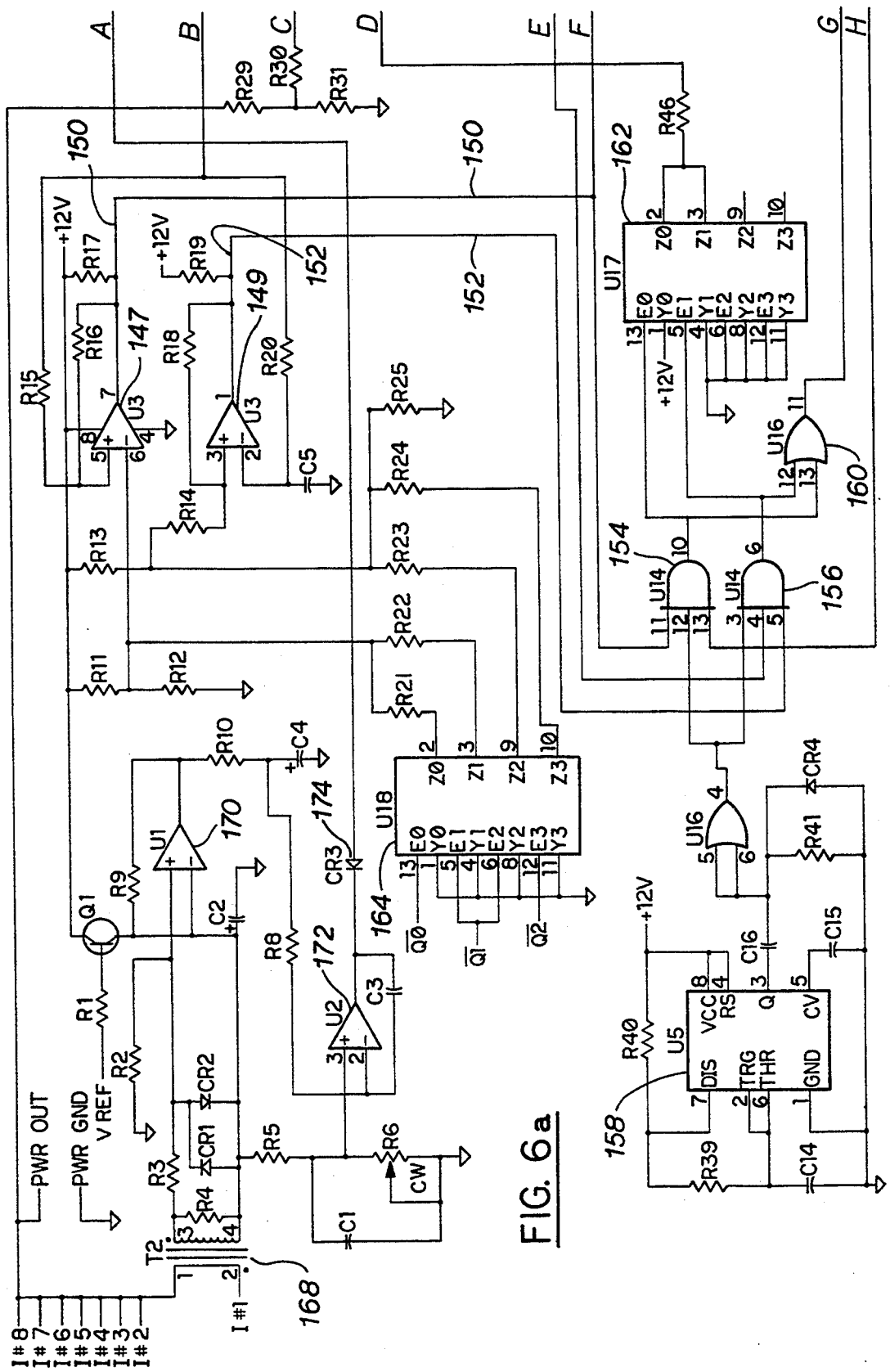
Figure 6B:
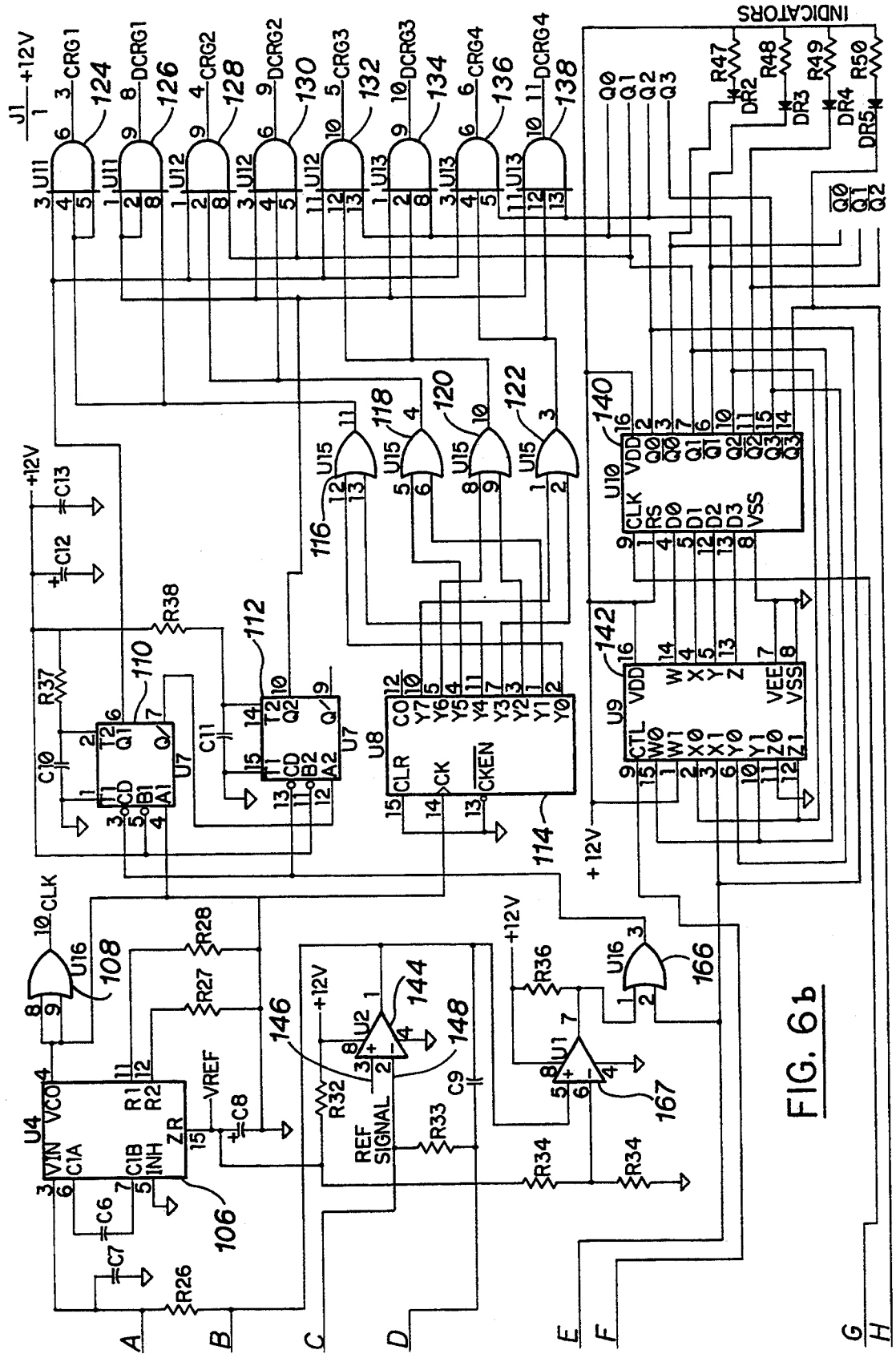

With the above overview and timing sequences in mind, and referring now to FIGS. 6a and 6b, a Motorola Phase Locked Loop Model MC14046B, 106 operated as a voltage controlled oscillator (VCO) generates a clock 108 and drives one half of a Motorola Dual Monostable Multivibrator, Model MC14528B 110 to provide typical charge pulses 38 for each oscillation of the VCO 106. The charge pulses 38 drive the other half of the Motorola Dual Monostable Multivibrator, 112 to provide corresponding discharge pulses 42. The oscillatory output of the VCO 106 is also counted in a Motorola Octal Counter/Driver Model 14022B, 114 which sequentially outputs a decoded pulse on one of eight lines Y0–Y7 for each input pulse. A Motorola Quad 2-Input "OR" Gate, Model MC 14071, 116–122, has Y0–Y7 wired on its inputs to provide the four sequentially occurring output signals, (Y0 or Y4), (Y1 or Y5), (Y2 or Y6), (Y3 or Y7). These outputs are applied as inputs to a series of "and" gates 124–138 fabricated from three Motorola Triple 3-Input "AND" Gates Model MC14073B. The "and" gates 124,128,132,and 136 also have as inputs the charge pulses 38 and the outputs of these "and" gates drive the charge MOSFETS of the converters 64–68. The "and" gates 126,130,134,138 have as inputs the discharge pulses 42 and the outputs of these gates drive the discharge MOSFETS of the converter 64–68. Selector signals Q0–Q2 in accordance with Table I are also inputs to the "and" gates 128–138. It will be noted that there is no selector signal applied to the gates 124,126 associated with the charge-discharge cycles of the converter 64. This means that the converter 64 is always on line, as previously stated. The circuit for generating the selector signals Q0–Q3 will be described below.

Figure 7:
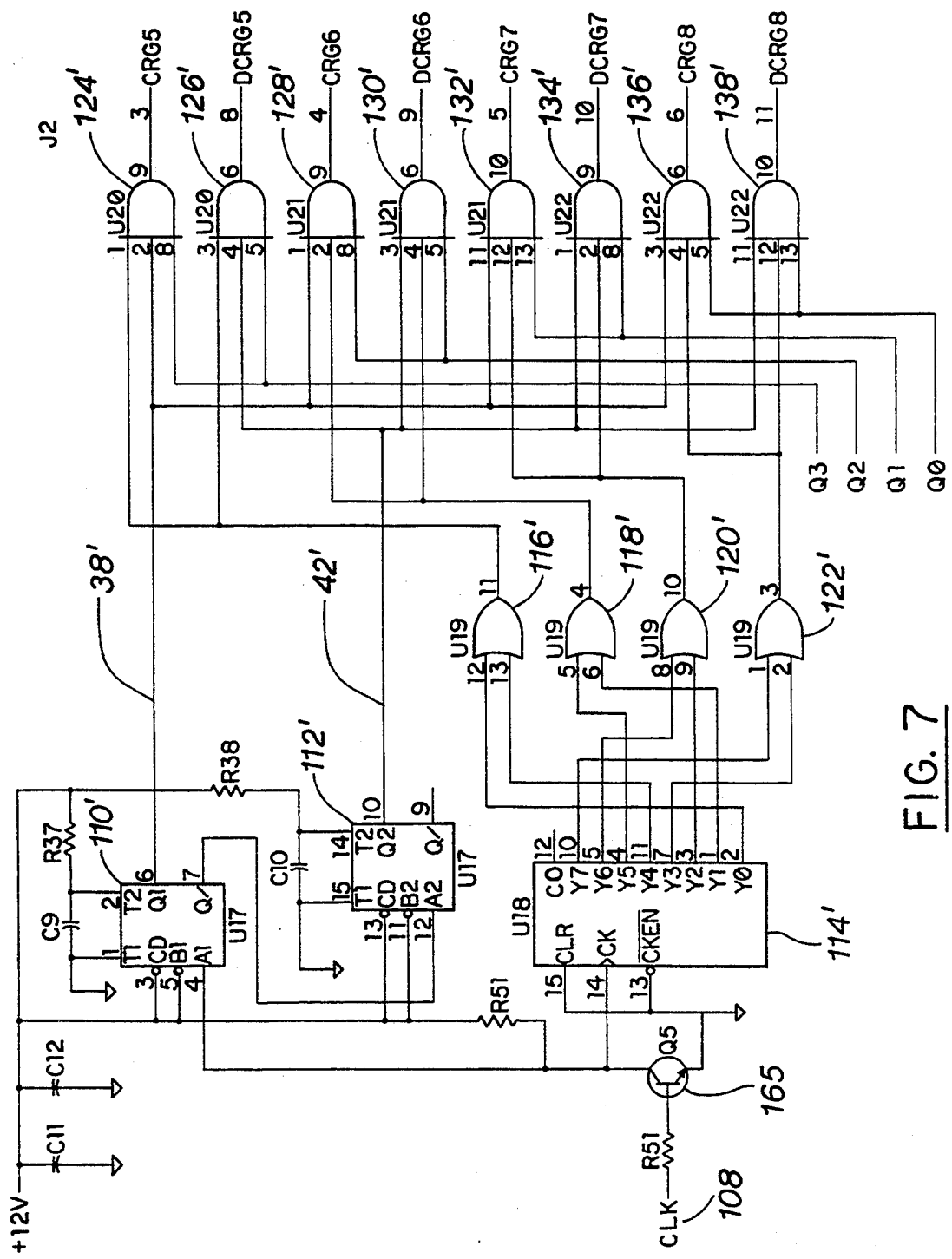

Sequencing signals Y0'–Y7' and the charge-discharge signals 38',,42' required for the cycling of the converters 72–78 of bank 84 are generated by identical circuits to those described above, and are shown in FIG. 7. The resultant signals have the phase relationships relative to the corresponding unprimed signals as seen in FIGS. 5a and 5g, and FIGS. 5b,5c,5d,5e and 5h, 5i, 5j, 5k. An output sequencer 114', charge pulse generator 110' and discharge pulse generator 112' are identical circuits to their counterparts 114,110 and 112. Instead of being driven directly by the output of the VCO 106, a clock pulse 108 derived from the output of the VCO 106 is applied to an inverting amplifier 165 whose output feeds the output sequencer 114' and the generators 110',112'. Because of the 180 degree inversion of the clock pulse 108 by the amplifier 165, the charge-discharge signals 38', 42', and the sequencing signals Y0'–Y7' are shifted by ½ a clock period in relation to their unprimed counterparts. The signals Y0'–Y7', and the signals 38',42' are applied to "or" gates 116'–118' whose outputs are connected as inputs to "and" gates 124'–138' in the same manner as their unprimed counterparts. Note that the same selector signals Q0–Q3 are also inputs of the gates 124'138'.

As previously explained the charge-discharge cycle of the first pair of converters brought on line 68,76 does not occur immediately after the completion of the charge-discharge cycle of the converter 64. One cycle time is allowed to elapse, as shown in FIG. 5c and 5i before the charge-discharge cycle of the converters 68,76 occurs. This is controlled by the selector signal Q0 as an input to the "and" gates 132,134 and 132'134'. Because the converter 64 is fired by a coincidence signal that includes the sequencing signal (Y0 or Y4) there is the time separation occupied by the (Y1 or Y5) signal between the firing of converters 64 and 68,76 as seen in FIGS. 5c and 5i.

The selector signals Q0–Q2 ( as well as an additional selector signal Q3), are generated and stored in four type D flip-flops configured from a Motorola Quad Type D Flip-Flop, Mc14175B, 140. The sequence of states of the four flip-flops Q0,Q1,Q2,Q3 of the quad 140 are controlled by a Motorola Quad 2-Input Analog Multiplexer/Demultiplexer, Type MC14551B wired as a four pole double throw switch 142. The "commons" of the switch 142 are wired to the four D inputs of quad 140, and the "make" and "break" contacts of the switch 142 have the signals Q2,Q1,Q0 applied to them such that, if the CTL point of the switch 142 is "high" indicating that additional converters are to be placed on line, and a pulse is applied to the CLK input of the quad 140, the four flip-flops of the quad 140 increase the number of "on", i.e. "1", states in conformance with Table I. If the CTL point of the switch 142 is "low" and a pulse is applied to the CLK input of the quad 140, the four flip-flops of the quad 140 decrease the number of "on" states in conformance with Table I.

Two mechanisms provide control of the output voltage in response to the load requirements. Smaller load changes are handled by changing the duty cycle of the charge-discharge cycle. Each charge-discharge cycle feeds a current pulse into the output capacitor 86, which raises the output voltage. By increasing the repetition rate of these pulses, the output voltage is raised; by decreasing the rate, the output voltage is lowered. As previously stated, the duty cycle is limited so that the charge-discharge pulses themselves do not occupy more than 25% of the period of the charge-discharge cycle.

The derivation of the signals calling for the change in duty cycle, and for the addition or the subtraction of converters 64–78 when the range of the duty cycle change is exceeded, will next be described. Referring to FIG. 6, a Motorola Low Power Dual Operational Amplifier Model LM 358, 144, has a reference signal 146 applied to one input and a signal 148 derived from the output voltage of the power supply (via the line "C") applied to the second input. When used as a motor driver, the reference signal 146 is the speed reference voltage and the feedback voltage 148 is the d.c. output of the tachometer 62 of FIG. 3. The output of the op-amp 144 is applied as the control voltage to Vin of the VCO 106, so that the VCO 106 speeds up when the need is to increase the voltage from the supply, and it slows down in order to lower the voltage. This correspondingly increases or decreases the repetition rate of the charge-discharge cycle; because the "one shots" 110,112 increase and decrease as they are driven by the output of the VCO 106.

The VCO 106 control voltage appearing at the output of the op-amp 144 is applied to the inputs of a pair of comparators 147,149, Motorola Dual LinCMOS ™ Differential Comparators, Model TLC 372C. This signal is applied to the (+) input of the comparator 147, and to the (−) input of the comparator 149. Reference voltages are applied to the other input of each of the comparators, as will be described below. When the VCO 106 control voltage is equal to or greater than the reference voltage applied to the second input of comparator 147, the output of the comparator 147, the signal line 150, goes "high". This means that the VCO is running at its maximum allowable repetition rate, and that to increase the output voltage an additional pair of converters 66–76 ( or converter 78) should be brought on line. When the VCO 106 control voltage is equal to or less than the reference voltage applied to the second input of the comparator 149, the output of the comparator 149, the signal line 152 goes "high". This means that the VCO rate has dropped to its minimum allowable rate, and that to decrease the output voltage a pair of converters 66–76 (or converter 78) should be removed from on line. The reference voltages at the second inputs depend upon the number of converters on line, and the reference voltage at the second input of the comparator 147 is always more positive than the reference voltage at the second input of the comparator 149. When the magnitude of the VCO 106 control voltage is between the reference voltages applied to the comparators 147,149, both comparator outputs are "low".

The reference voltages applied to the comparators 147,149 are determined by the positions of four independent single pole switches configured from a Motorola Quad Analog Switch/Quad Multiplier, Model MC14016B, 164. A network of resistors R21–R24 are wired on the "arms" of the switches 164, and ground is wired to the make contacts of the switches. The signals "not Q0", "not Q1" and "not Q2" control the "pickup" of the switches. Depending upon the status of the selectors Q0–Q2, none, some or all four of the switches 164 will be closed, adjusting the magnitude of the reference voltages applied to the comparators 147,149 by means of the resistor network R21–R24. This adjustment is required as a function of the number of converters on line to ease the transition from no load to full load, and in particular, to keep the short circuit feedback from interfering with the voltage control feedback.

The signal line 150 is one input of an "and" gate 154, and the signal line 152 is one input of an "and" gate 156. The "and" gates 154,156 are implemented in a Motorola Triple 3-Input "AND" Gate, Model MC14073B. Clock pulses from an independent clock pulse generator 158 are also applied to the "and" gates 154,156. The third input to the "and" gate 154 is the "not Q3" output of the selector 140. Referring to Table I, it will be appreciated that the "not Q3" signal is "high" when some or all of the converters 66–78 except for converter 72 are on line. Therefore when the "and" gate 154 output goes "high", it is a signal that not all the converters 66–78 are already on line, and that another pair of converters 64–78 is required on line. The output of the gate 154 feeds an "or" circuit 160 whose output is applied as a clock pulse to the selector 140.

The path for removing converters from on line is via the "and" gate 156. In addition to the clock signal from the generator 158, and the signal line 152 being applied as inputs to the "and" gate 156, the Q0 signal from the selector 140 is an input to the gate 156. As previously stated, when the signal line 152 is "high", a converter 64–70 should be removed from on line. Referring again to Table I, it is seen that the presence of the Q0 signal indicates that at least one converter, other than the converter 64 which is always active, is available to be disconnected from the power supply output. The output of the gate 156 also feeds the "or" circuit 160, which as previously stated applies a clock pulse to the selector 140.

As earlier described, when a clock pulse is applied to the selector 140 the output of the switch 142 sets the selector 140 flip-flops to the appropriate states in accordance with Table I above. It will be recalled that the output signals Q0–Q2 of the selector 140 gate the charge-discharge pulses 38, 42, 38',42' and the sequencing signals Y0–Y7, Y0'–Y7' to activate the pairs of converters 66–78 ( and converter 72) thereby adding or removing on line converters that charge the output capacitor 86.

Just prior to adding a new converter on line, the VCO 106 is running at its maximum allowable speed in an attempt to pour more charge into the output capacitor 86 so that the output voltage would be raised. As soon as the new converter comes on line it is advantageous to drop the repetition rate of the VCO 106 by decreasing the VCO control voltage, i.e. the output of the op-amp 144. Similarly, just prior to removing a converter from active status, the VCO 106 is operating at its lowest speed in order to decrease the charge poured into the output capacitor 86. As the converter is removed from on line, it is now advantageous to speed up the VCO 106 by increasing the VCO control voltage, i.e. the output of op-amp 144. These changes to the VCO control voltage are accomplished as follows. A Motorola Quad Analog Switch/Quad Multiplier, Model MC14016B is wired as two switches 162 having normally open contacts. The output signal of the "and" gate 154, i.e. the signal indicating addition of a converter, is applied to the control point E0 of one of the switches 162. When E0 is "high" the point Y0 is connected to Z0 feeding 12 volts through the resistor 46 to one input of the op-amp 144 forcing the output of the op-amp 144 to decrease, slowing the repetition rate of the VCO 106. Similarly, when the output of the gate 156 is "high", control point E1 closes the other of the switches 162 connecting the point Y1 to Z1 and feeding a ground through the resistor R46 to the input of the op-amp 144 to speed up the VCO 106.

The preferred embodiment also includes circuits for dealing with two exceptional conditions: (1) operation of the supply into an open circuit and (2) operation of the supply into a short circuit.

When the supply is operated open circuit and there is no load current drawn, converters will be dropped off line until only the converter 64 remains active. Because there is no current being drawn (except for a negligible leakage current), each time a charge-discharge cycle occurs the converter 64 will pour charge into the output capacitor 86 and the output voltage will progressively rise. This will continue even though the repetition rate of the VCO 106 is running at its lowest rate, that is, when the output of the op-amp 114 which is the VCO control voltage, is at its lowest value. The output of the op-amp 114 is applied to the input of a Motorola Differential Comparator TLC372C, 167. About 0.5 volt is applied to the other input of the comparator, and as long as the VCO is above 0.5 volts, the output of the comparator remains "high". When the supply is open circuit, the VCO control voltage drops below 0.5 volts, and the output of the comparator 167 drops to ground potential. The output of the comparator 167 is also connected as one input of an "or" circuit 166, whose other input is the "not Q0" signal. From Table I, "not Q0" occurs when the converter 64 is the only converter on line. Therefore, the output of the "or" gate 164 goes to ground when only converter 64 is on line, and the VCO control voltage is almost zero. This ground is applied to the reset pins of the one shots 110,112 to keep them from firing. Under these conditions, the charge discharge cycle is stopped and no further charge is transferred to the output capacitor 86, halting the increase in output voltage.

The problem of a short circuit applied to the output of the supply is solved in the following manner. The output of all the converters 64–78 are connected in parallel to configure the output of the supply; the current output of the always on-line converter 64 being connected to the output through a single turn primary of a current transformer 168. This transformer monitors the output current pulse of the converter 64. The pulse out of the transformer 168 secondary is amplitude limited and applied as one input to a comparator 170. The other input of the comparator 170 has a reference voltage Vref applied to it. When the amplitude of the converter 64 current pulse through the transformer is greater than Vref, the output of the comparator 170 is positive, and the output stays positive all during the time that the current pulse is greater than Vref. The comparator 170 shapes the current pulse into a squared voltage pulse at its output. The squared output pulse has a given duty cycle depending on the VCO operating frequency and the width of the current pulse generated by the converter 64. During a short circuit, the VCO frequency will be fixed at its maximum rate. The output duty cycle of the comparator 170 is then set only by the current pulse width of the converter 64. The squared output voltage of the comparator 170 is low pass filtered by R10-C4 and applied to the negative input of op-amp 172 configured as an integrator. The output of the low pass filter is a dc voltage proportional to the duty cycle of the output of the comparator 170. An adjustable dc voltage reference is connected to the positive input of the op-amp 172, and this adjustment sets the amount of short circuit current allowed. When there is a dead short on a converter output, the current pulses through the inductors 12,30 (FIG. 1) become very wide because the discharge potential across the inductors is very small with output shorted to ground. If the duty cycle of the current pulse becomes greater than that allowed by the dc reference voltage, the output of the op-amp 172 starts decreasing from its most positive level. Diode 174 starts to conduct and overrides the VCO command from the op-amp 144. The VCO frequency decreases in a linear manner to keep the duty cycle of the current pulse output of the generator 64 constant. As long as the duty cycle remains constant, the output of the supply can maintain a continuous short circuit. It will be noted that all output current generators have the same pulse shape as the generator 64, and therefore will also support a continuous short circuit. It will be appreciated that in this manner a large short circuit current can be adjusted and maintained. In a dc motor application, this allows full stall torque to be obtained from the motor under heavy load conditions.

Figure 8:
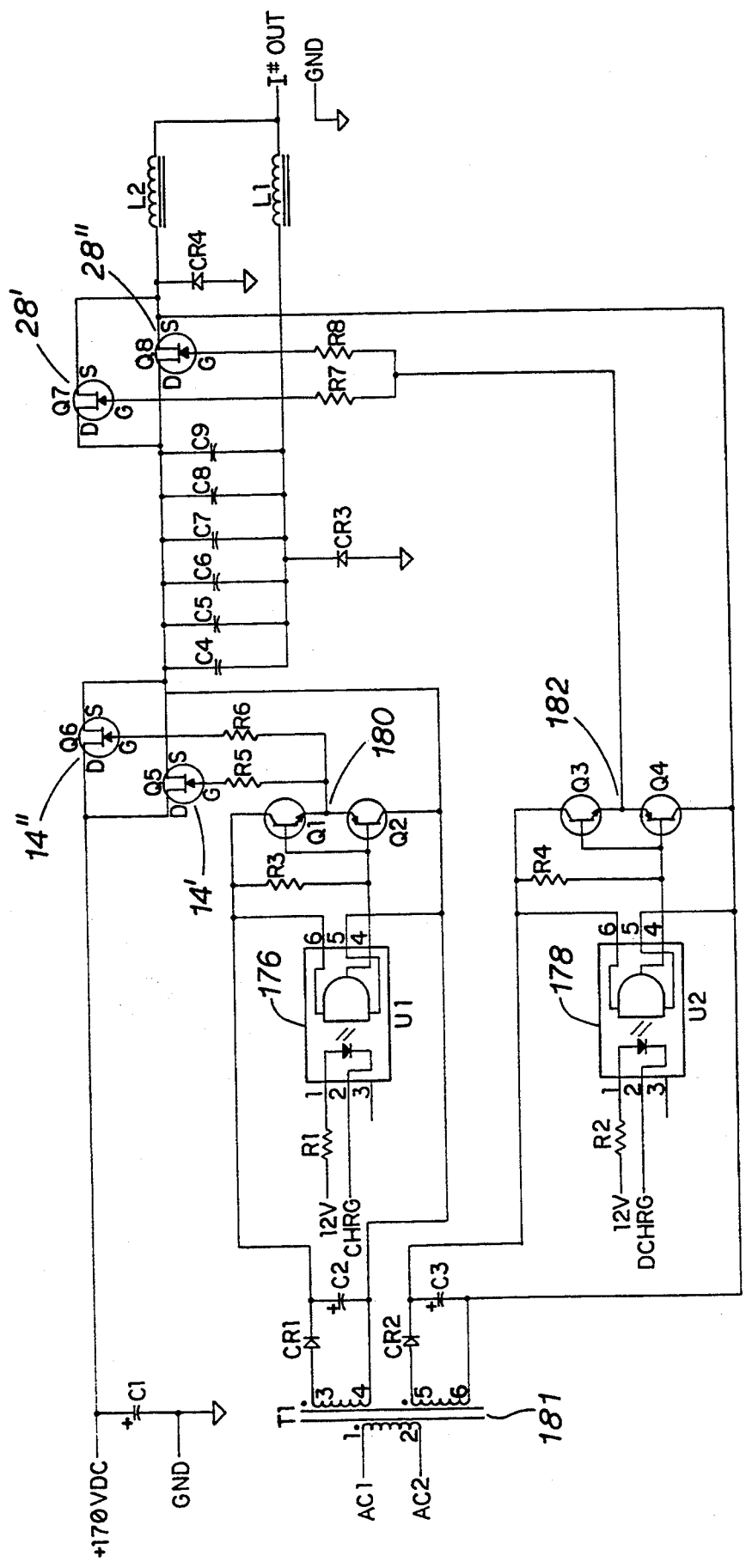
FIG. 8 is a circuit diagram of an embodiment of the pulsed resonant converter of the invention.

FIG. 1 schematically represents the structure of the converter of the invention, while FIG. 8 is the circuit diagram of an actual implementation of a converter. The charge MOSFET 14 consists of two paralleled 14',14" transistors, and the discharge MOSFET 28 consists of two paralled 28',28" transistors. The transistors 14',14",28',28", are International Rectifier Company Power MOSFETS Model IRF 640. With the goal of providing a high efficiency converter, the paired power MOSFETs are driven in parallel to reduce conduction losses and to improve efficiency into the 90% level of performance. To further enhance efficiency and to enable ease of use for different input dc voltages, free floating MOSFET gate drivers Q1,Q2 and Q3,Q4 provide added current output capabilities at the points 180,182 for driving the gates of the switches 14', 14" and 28',28" respectively. Photon Coupled Isolators, 176,178, Model H11N1 manufactured by Harris Semiconductor Corp, Melbourne, Fla., allow the level shifting of the system logic signals which operate between 0 and +12 volts to reliably fire the free floating MOSFET switch gates. An a.c. line driven small one to one transformer 181, with two secondaries is used to create the isolated +12 v dc supplies for the charging MOSFET gate driver (176,180), and for the discharging MOSFET gate driver (178,182).

It will also be noted that the capacitor 10 of FIG. 1 is implemented as six paralleled capacitors C4-C9 in FIG. 8. This reduces losses due to high currents flowing in the series LC resonant circuit.

Figure 9:
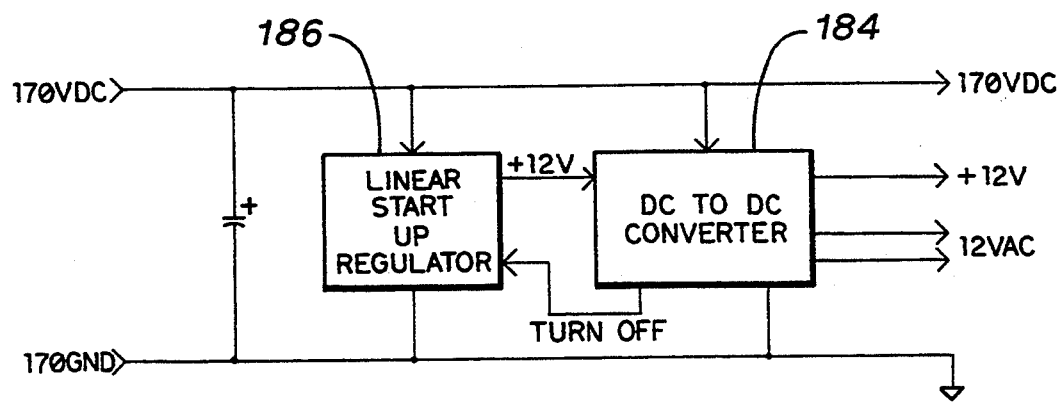
FIG. 9 is a block diagram showing the use of a start up regulator and dc to dc converter which supplies power to the circuits of the converter of the invention.

Referring again to FIG. 9, a conventional dc to dc flyback converter 184 provides a +12 v dc power supply (referenced to ground) for all of the control circuits. The front end 186 of the 170 v dc to +12 v dc flyback converter is a linear 12 v dc regulator which is used to start the flyback converter 184 when the main input power comes on. As soon as the +12 v dc from the flyback converter 184 comes up, the linear 12 v dc regulator 186 is shut off to prevent it from using any input power. An additional secondary of the flyback converter 184 transformer has the same number of turns as the winding which generates the main 12 v dc supply. This 12 v ac voltage winding is used by all of the floating transformers, e.g. 181, which create the floating 12 v dc supplies for the MOSFET gate drivers (FIG. 8). With all of the windings of the transformers 181 having the same turns ratio, all the floating 12 vdc supplies are identically regulated by the flyback converter 184.

The invention has been described in detail with particular reference to preferred embodiments thereof, but it will be understood that variations and modifications can be effected within the spirit and scope of the invention. For example, with additional output filtering the invention may be configured as a power supply for electronic circuits.

What is claimed is:

1. A dc to dc converter having first and second output terminals, said converter for use with a cooperative dc power supply, said converter comprising:
    a) an output filter connected across said first and said second output terminals,
    b) a series LC resonant circuit comprising a capacitor having its output terminal connected to the input terminal of a first inductor, the output terminal of said first inductor being connected to said output filter and said first output terminal,
    c) first switching means for connecting said power supply to the input terminal of said capacitor when said first switching means is closed, and for disconnecting said power supply from said input terminal when said first switching means is open,
    d) first control means for closing said first switching means whereby a first current flows through said series LC circuit into said output filter when said first switching means is closed,
    e) second control means for opening said first switching means to disconnect said input terminal of said capacitor from said power supply when the voltage across said capacitor equals the voltage of said power supply,
    f) first means for alternately sourcing the flow of said first current into said first inductor after opening of said first switching means, whereby said first current continues to flow into said output filter,
    g) a second inductor having its output terminal connected to said output filter and said first output terminal, h) second switching means for connecting said capacitor input terminal to the input terminal of said second inductor when said second switching means is closed, and for disconnecting said capacitor input terminal from said input terminal of said second inductor when said second switching means is open, i) third control means for closing said second switching means when said voltage across said capacitor equals said power supply voltage, whereby a second current flows through said second inductor from said capacitor into said output filter when said second switching means is closed, j) fourth control means for opening said second switching means when said voltage across said capacitor decays to zero, and k) second means for alternately sourcing the flow of said second current after said second switching means is opened, whereby said second current continues to flow through said second inductor into said output filter.

2. The dc to dc converter of claim 1 wherein said first and said second switching means are power MOSFETs.

3. The dc to dc converter of claim 2 wherein said MOSFETS are switched by means of level shifting photon coupled isolators.

4. The dc to dc converter of claim 1 wherein said first means for alternately sourcing said first current is a diode connected between said second output terminal and said input terminal of said first inductor.

5. The dc to dc converter of claim 1 wherein said second means for alternately sourcing said second current is a diode connected between said second output terminal and said input terminal of said second inductor.

6. The dc to dc converter of claim 1 configured as a motor drive amplifier.

7. The dc to dc converter of claim 1 configured as a constant voltage power supply.

8. A high power dc to dc converter for operation with a cooperative dc power supply, said converter comprising:

a) a multiplicity of identical, dc to dc converter sub units each having first and second input terminals and first and second output terminals, said dc to dc converter subunits further having their input terminals connected in parallel across said dc power supply, and their output terminals connected in parallel across an output filter, b) sequencer means for activating or deactivating individual ones of said converter sub units, c) means for current control of said activated dc to dc converter subunits, said means for current control having upper and lower control limits, said means for current control further being responsive to the load demand on said high power dc to dc converter, and d) means for enabling said sequencer means for activating or deactivating individual ones of said converter sub units, said means for enabling being responsive to said means for current control when said means for current control reaches said upper or lower control limit.

9. The high power dc to dc converter of claim 8 wherein each dc to dc converter sub unit of said high power dc to dc converter comprises:

a) a series LC resonant circuit comprising a capacitor having its output terminal connected to the input terminal of a first inductor, the output terminal of said first inductor being connected to said output filter and said first output terminal, c) first switching means for connecting said power supply to the input terminal of said capacitor when said first switching means is closed, and for disconnecting said power supply from said input terminal when said first switching means is open, d) first control means for closing said first switching means whereby a first current flows through said series LC circuit into said output filter when said first switching means is closed, e) second control means for opening said first switching means to disconnect said input terminal of said capacitor from said power supply when the voltage across said capacitor equals the voltage of said power supply, f) first means for alternately sourcing the flow of said first current into said first inductor after opening of said first switching means, whereby said first current continues to flow into said output filter, g) a second inductor having its output terminal connected to said output filter and said first output terminal, h) second switching means for connecting said capacitor input terminal to the input terminal of said second inductor when said second switching means is closed, and for disconnecting said capacitor input terminal from said input terminal of said second inductor when said second switching means is open, i) third control means for closing said second switching means when said voltage across said capacitor equals said power supply voltage, whereby a second current flows through said second inductor from said capacitor into said output filter when said second switching means is closed, j) fourth control means for opening said second switching means when said voltage across said capacitor decays to zero, and k) second means for alternately sourcing the flow of said second current after said second switching means is opened, whereby said second current continues to flow through said second inductor into said output filter.

10. The high power dc to dc converter of claim 9 wherein said first control means and said second control means include means for cyclical control of said first switching means.

11. The high power dc to dc converter of claim 10 wherein said third control means and said fourth control means include means for cyclical control of said second switching means.

12. A dc to dc converter having first and second converter output terminals, said converter for use with a cooperative dc supply, said converter comprising:

a) first and second inductors each having input and output inductor terminals, wherein said first inductor's output inductor terminal and said second inductor's output inductor terminal are connected to said first converter output terminal, b) a capacitor, having capacitor input and output terminals, for forming a first series resonant circuit with said first inductor, and for forming a second resonant circuit with said second inductor, c) first switching means for connecting said dc supply to said input capacitor terminal whereby charging current flows in said first resonant circuit to said first converter output terminal, d) first diode means for sourcing current through said first inductor to said first converter output terminal, f) second switching means for connecting said capacitor input terminal to said input terminal of said second inductor whereby discharging current flows through said second resonant circuit to said first converter output terminal, and g) second diode means for sourcing current through said second inductor to said first converter output terminal.

* * * * *